Mar. 20, 1923.
C. W. GRAHAM.
APPARATUS FOR CUTTING AND HANDLING CAN END LINERS.
ORIGINAL FILED JULY 18, 1916.
1,448,839.
3 SHEETS—SHEET 1.
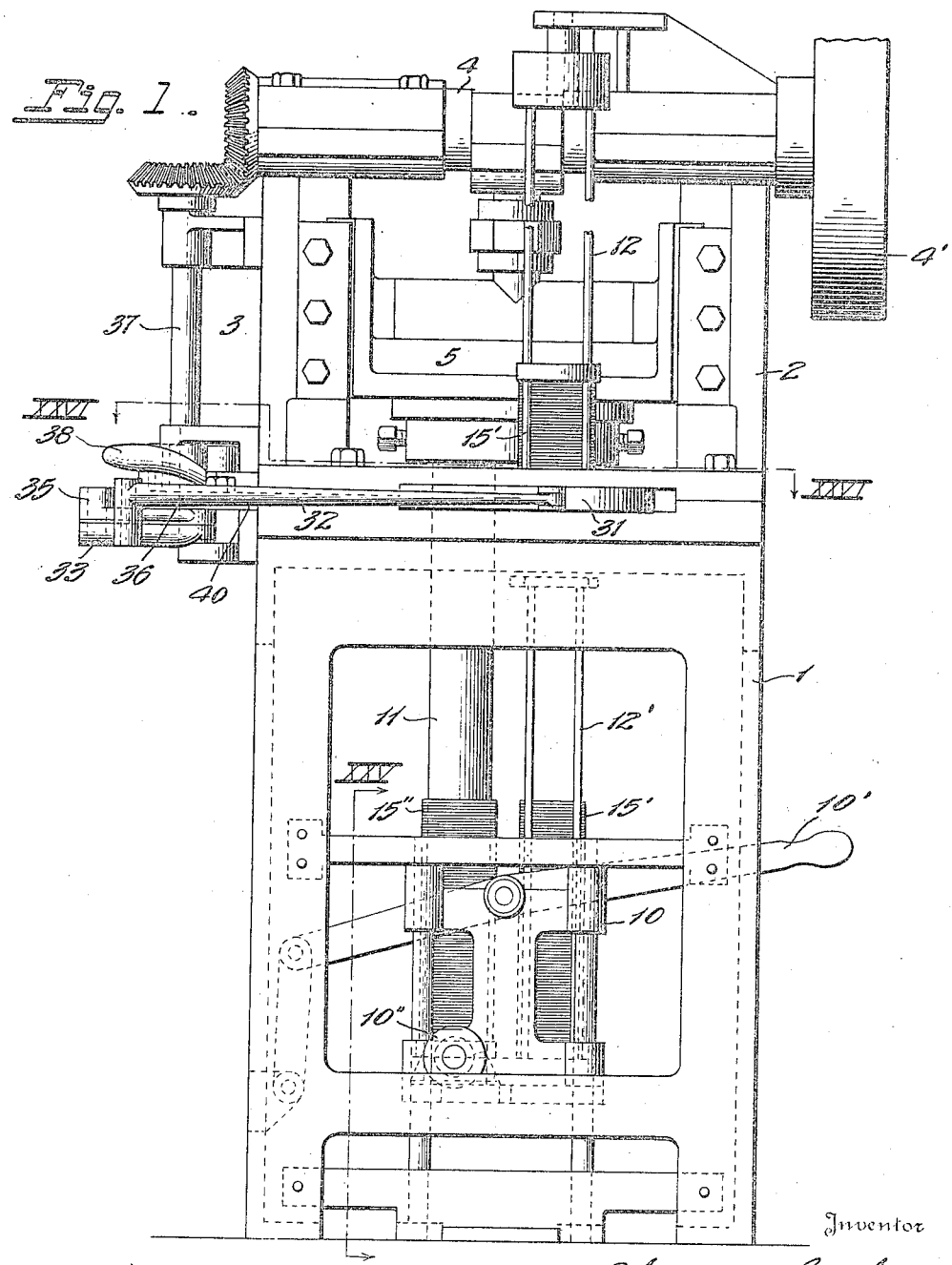
Inventor
Charles W. Graham
By H. N. Low
Attorney Mar. 20, 1923.
C. W. GRAHAM.
APPARATUS FOR CUTTING AND HANDLING CAN END LINERS.
ORIGINAL FILED JULY 18, 1916.
1,448,839.
3 SHEETS—SHEET 2.
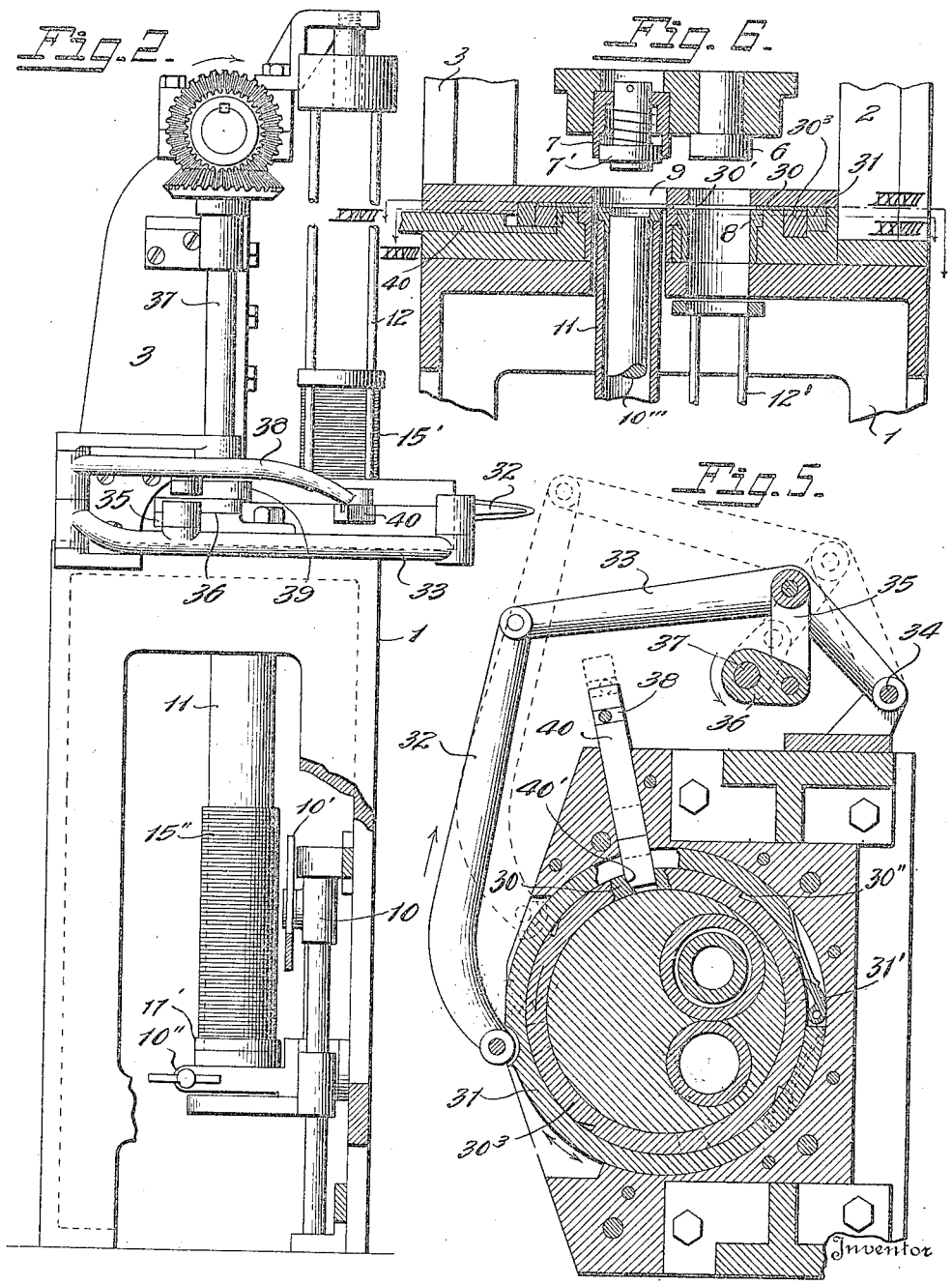
Inventor
Charles W. Graham
By
A N Low
Attorney Mar. 20, 1923.
C. W. GRAHAM.
APPARATUS FOR CUTTING AND HANDLING CAN END LINERS.
ORIGINAL FILED JULY 18, 1916.
1,448,839.
3 SHEETS—SHEET 3.
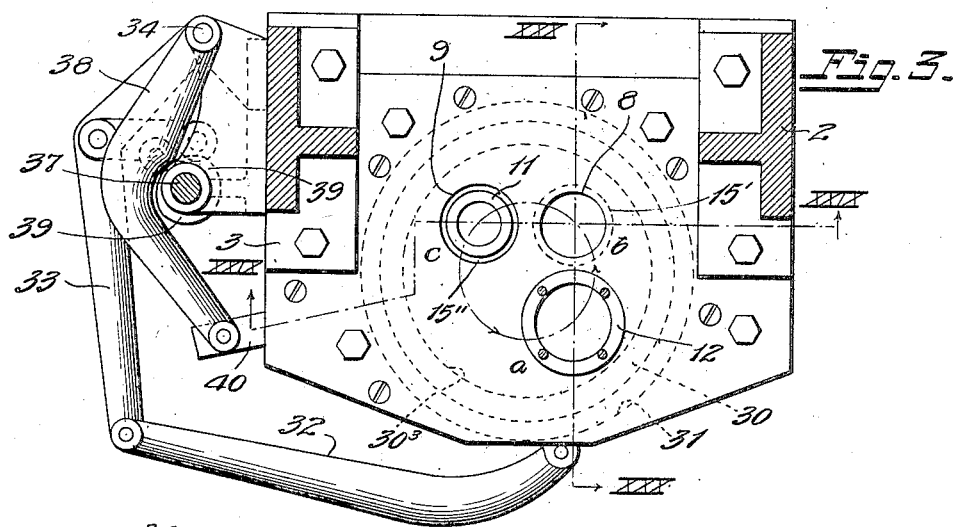
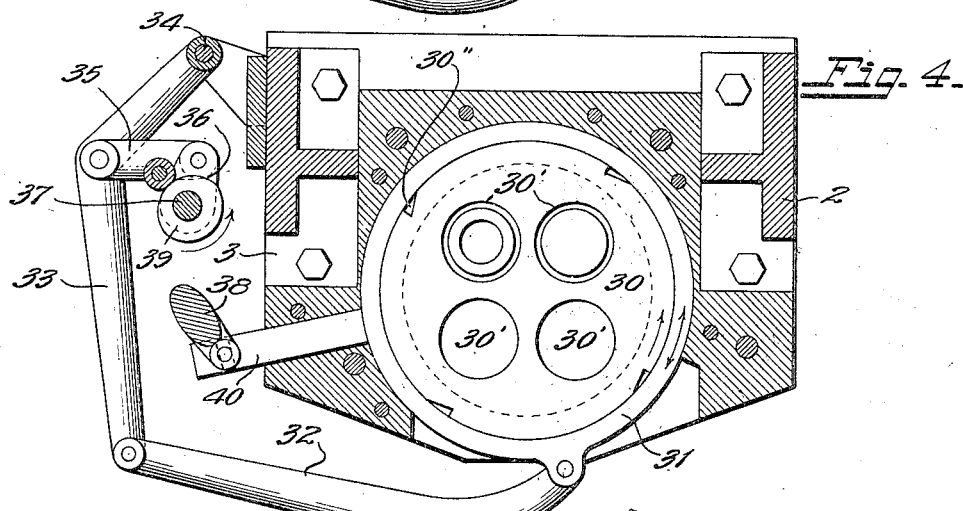
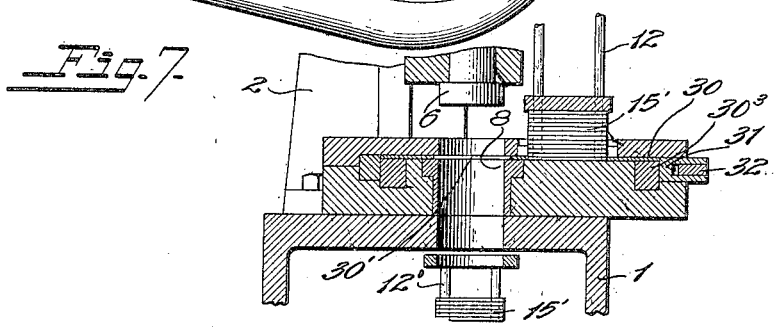
Inventor
Charles W. Graham
By H. N. Law
Attorney Patented Mar. 20, 1923.

1,448,839

UNITED STATES PATENT OFFICE.

CHARLES W. GRAHAM, OF ALLENDALE, NEW JERSEY, ASSIGNOR TO AMERICAN CAN COMPANY, OF NEW YORK, N. Y., A CORPORATION OF NEW JERSEY.

APPARATUS FOR CUTTING AND HANDLING CAN-END LINERS.

Original application filed July 18, 1916, Serial No. 109,943. Patent No. 1,355,040, dated October 5, 1920. Divided and this application filed August 28, 1920. Serial No. 406,671.

*To all whom it may concern:*

Be it known that I, CHARLES W. GRAHAM, a citizen of the United States, residing at Allendale, in the county of Bergen and State of New Jersey, have invented certain new and useful Improvements in Apparatus for Cutting and Handling Can-End Liners, of which the following is a specification.

The invention relates to cutting and handling can end liners in bulk, previous to applying them to can ends; and handling gasket material in the shape of core discs, cut from the centers of the liners, and in the parts and combinations thereof hereinafter set forth and claimed.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 1 is a front elevation of the machine arranged for automatically feeding disc blanks from an inverted core stack for cutting smaller cores and ring liners and assembling them into stack formation, the same as when cut from a strip or web.

Fig. 2 is a side elevation of Fig. 1.

Fig. 3 is a sectional plan taken on line XXVI—XXVI of Fig. 1 showing the relation of the various parts of mechanism for operating the feed means for feeding the disc blanks.

Fig. 4 is a similar section plan to Fig. 3 but taken on line XXIVII—XXIVII of Fig. 6, showing the parts in the same positions as in Fig. 3 but more in detail.

Fig. 5 is a similar view to Fig. 4 but taken on line XXVIII—XXVIII of Fig. 6, showing the parts in full lines in the same positions as Figs. 3 and 4 and showing an extreme position in dotted lines.

Fig. 6 is a vertical section view taken on line XXIX—XXIX of Fig. 3 showing the stack holders and cutting dies in their normal working positions.

Fig. 7 is a vertical sectional view taken on line XXX—XXX of Fig. 3 showing the relation of the disc, stack and the perforating punch.

I have referred particularly to cutting liners from paper or like material. Paper or such fibrous material is, however, only one of the many materials suitable for gaskets or liners for can ends. Rubber compositions have been used for many years. Such material as cellulose compounds, rendered somewhat flexible and yielding by admixture with softening agents, such for instance as acetic acid compounds of cellulose, similar to cellulose acetate in colloidal form, which may be produced by partial acetilization of the original cellulose material; also compositions of gelatine or other albuminous matter rendered pliable by a suitable softening agent such as glycerine, are entirely suitable for the purpose, as long as they will fold into the double seam without cracking or checking. Thin sheet metal of a soft and yielding nature, such for example as tin foil, is also suitable for lining can ends.

It is possible to impregnate cloth with suitable surfacing material so as to render it available for gaskets. I, therefore, wish to extend my means for handling can end liners, to the use of any material from which can end liners can be made.

Referring to the drawings, the machine illustrated is adapted for cutting ring liners from disc blanks previously cut from a web or strip. These disc blanks may be produced by any suitable cutting mechanism, and where relatively small ring liners are to be made the disc blanks to be cut therefrom may be the core pieces produced in the forming of relatively large ring liners, as is done by the machine described in my companion divisional application Serial No. 406,670 filed Aug. 28, 1920. In the case last supposed the core stack carriers 12, filled with core pieces, are taken from the machine of my said application and are inverted and placed in the machine herein illustrated, as shown in Figs. 1 to 3. The mechanism for feeding individual discs from the inverted delivering stacks consists of an intermittently rotatable feed disc or plate 30, mounted to rotate in a rocking feed ring 31; this feed ring is operated through the link 32, and pivoted lever 33, pivoted at 34. The lever 33 is operated from a link 35 and crank 36, the crank 36 being secured to the vertical drive shaft 37 and having continuous rotation. A pivoted lever 38 operated by a cam 39 on the shaft 37, serves to operate a locking and aligning dog 40, which locks the feed disc 30 against rotation and aligns the disc blanks fed thereby with the cutting punch 6.

The feed disc 30 is of thin sheet metal of practically the thickness of the disc blanks 15' and the inverted stack holder 12 rests directly on the feed disc 30. The feed disc 30 has preferably four orifices 30' (Fig. 4) of a diameter to just admit a disc blank at each step movement of the disc 30; the disc blank resting in the orifice directly under the stack of blanks, is stripped from the bottom of the stack and transported into alignment with the cutting punch 6, that is, from position $a$, Fig. 3 to position $b$; the disc blank at $b$ is perforated by the punch 6 and the core center pushed down through the die 8 into the underneath receiving stack carrier 12', the ring liner 15'' remaining in the orifice 30' of the feed plate 30; at the next step movement of the feed plate 30 another disc blank is transported from position $a$ to position $b$ and the previously cut liner 15'' in the orifice 30' at position $b$ is transported to position $c$, where it is pushed through the orifice die opening 9 onto the stack core 11, where a stack of ring liners is accumulated as the machine operates. A weight 11' (Fig. 2) serves to cause the liners to feed along the core 11, as liners are removed successively by the can end lining machine through the operation of the feed mechanism. Such a machine is set forth in my companion application Ser. No. 406,672, filed Aug. 28, 1920. The said weight does not have a feeding function in the machine herein claimed but in this machine is arranged and prepared relative to the ring liners for its feeding function in the lining machine. It is necessary to operate the feed disc 30 with some precision as the orifice 30' must align simultaneously at position, $a$, $b$ and $c$. The mechanism for accomplishing this precision movement is operated from the vertical shaft 37, the continuous rotation of this shaft carrying the crank 36, oscillates the link 35, the lever 33, and link 32, thereby giving a rocking motion to the feed ring 31.

The feed ring 31 carries a pawl 31' (Fig. 5) that engages into recesses 30'' around the edge of the feed plate 30. The edge of the feed plate 30 is reinforced with a ring $30^3$ (Figs. 5 and 6). During the rotary movement of the ring $30^3$ the locking dog 40 is drawn out of engagement with the disc 30, through the action of the cam 39 rotating with the shaft 37, and as soon as the feed plate 30 reaches an end of its step movement the dog 40 is instantly moved by the cam 39 and lever 30, into engagement with the ring $30^3$, secured to the disc 30, entering a wedge shaped opening 40' (Fig. 5) therein, thus locking and aligning the feed plate 30 with the stations $a$, $b$ and $c$.

The inner end of the locking dog 40 is reduced in thickness and passes under the feed ring 31 (Fig. 6) and enters the wedge opening 40' in the lower side of the reinforcing ring $30^3$.

When operating on core discs the cutting punch 7 does no cutting but acts simply as a stripping punch, pushing the ring liner from the orifice 30' onto the stack carrier 11.

The manner of placing the stack unit into a lining machine and applying the liners to a can end, and means for such purpose, are set forth in my companion divisional application Serial No. 406,672, filed Aug. 28, 1920.

This application is a division of my application Serial No. 109,943, filed July 18, 1916, now Patent No. 1,355,040.

It will be understood that the described mechanism may be supported and operated in any suitable or known manner. I have shown for the purpose a base frame or housing 1 having bolted thereto upright frame members 2 and 3 having suitable bearings for the support of a main driving shaft 4 provided with a pulley 4'. This shaft is geared, as seen in Fig. 1, with the said vertical shaft 37 to rotate the same continuously. The shaft 4 is provided with a cam or eccentric of usual construction which reciprocates vertically a cross head 5 guided by said frame members 2 and 3, and the cross head carries the punching and depositing members 6 and 7 already referred to. 7' is a yielding pilot member adapted to engage the upper end of the ring liner stack holder 11 at the time when the cut ring liner is being deposited thereon by the annular die or pusher 7.

The liner stack holder 11 and the core stack holder 12' are supported by a vertically movable cross head 10 (Fig. 1) on which is a tilting holder 10″ for the liner stack holder, and after said stack holders have been placed on the cross head the latter is lifted by means of the handle 10′, as more fully explained in my said other application.

10‴ is a supporting post held on the tilting holder or socket 10″ and extending up within the liner stack holder to center the upper end of the same.

What is claimed is—

1. In a machine for cutting and depositing ring liners, the combination of an intermittently rotatable feed plate having a circular series of orifices adapted to receive disc blanks in said orifices successively, an oscillating feed ring enclosing said feed plate and having means for engaging the latter to rotate the feed plate intermittently in one direction, means for actuating said oscillating ring, means at a cutting station for producing ring liners from said disc blanks, and means at a depositing station for removing the cut ring liners from said feed plate.

2. In a machine for cutting and depositing ring liners, the combination of an intermittently rotatable feed plate having a circular series of orifices adapted to receive disc blanks in said orifices successively, a ring fixed to said feed plate, an oscillating feed ring enclosing said feed plate and ring fixed thereto and having means for engaging the latter to rotate the feed plate intermittently in one direction, means for actuating said oscillating ring, means at a cutting station for producing ring liners from said disc blanks, and means at a depositing station for removing the cut ring liners from said feed plate.

3. In a machine for cutting and depositing ring liners, the combination of an intermittently rotatable feed plate having a circular series of orifices adapted to receive disc blanks in said orifices successively, an oscillating feed ring enclosing said feed plate and having means for engaging the latter to rotate the feed plate intermittently in one direction, means for actuating said oscillating ring, means at a cutting station for producing ring liners from said disc blanks, means at a depositing station for removing the cut ring liners from said feed plate, and a liner stack holder in the form of a core to engage within said removed ring liners.

4. In a machine for cutting and depositing ring liners, the combination of an intermittently rotatable feed plate having a circular series of orifices adapted to receive disc blanks in said orifices successively, a ring fixed to said feed plate, an oscillating feed ring enclosing said feed plate and ring fixed thereto and having means for engaging the latter to rotate the feed plate intermittently in one direction, means for actuating said oscillating ring, means at a cutting station for producing ring liners from said disc blanks, means at a depositing station for removing the cut ring liners from said feed plate, and an invertible liner stack holder at said depositing station in the form of a core having a movable liner feeding weight at its bottom.

5. In a machine for cutting and depositing ring liners, the combination of an intermittently rotatable feed plate having a circular series of orifices adapted to receive disc blanks in said orifices successively, a ring fixed to said feed plate, an oscillating feed ring enclosing said feed plate and ring fixed thereto and having means for engaging the latter to rotate the feed plate intermittently in one direction, means for actuating said oscillating ring, means at a cutting station for producing ring liners from said disc blanks, means at a depositing station for removing the cut ring liners from said feed plate, a liner stack holder at said depositing station, and means for moving said stack holder vertically.

6. In a machine for cutting and depositing ring liners, the combination of an intermittently rotatable feed plate having a circular series of orifices adapted to receive disc blanks, means for supplying disc blanks to said orifices successively, a ring fixed to said feed plate, an oscillating feed ring enclosing said feed plate and ring fixed thereto and having means for engaging the latter to rotate the feed plate intermittently in one direction, means for actuating said oscillating ring, means at a cutting station for producing ring liners from said disc blanks, means at a depositing station for removing the cut ring liners from said feed plate, a liner stack holder at said depositing station, and a tilting support for the bottom end of said liner stack holder.

7. In a machine for cutting and handling ring liners, the combination of a thin and intermittently rotatable feed plate having a circular series of orifices adapted to receive disc blanks of liner material from a stack of the same, a stack holder for said blanks arranged at a feeding station to allow the lowermost blank to rest on the surface of said feed plate at the path of said series of orifices, an oscillating feed ring inclosing the feed plate and having means for engaging the same to rotate the feed plate intermittently in one direction, means for oscillating said feed ring, means for centering said feed plate with three of said orifices respectively at the blank feeding station, a cutting station and a ring liner depositing station, cutting means arranged at said cutting station for producing a ring liner from the disc blank, means at said depositing station for forcing the cut ring liner out of its orifice in the feed plate and on to a stack holder, and a stack holder at said depositing station for receiving said cut ring liner.

8. In a machine for cutting and handling ring liners, the combination of a thin and intermittently rotatable feed plate of the thickness of a ring liner and having a circular series of orifices adapted to receive disc blanks of liner material from a stack of the same, a stack holder for said blanks arranged at a feeding station to allow the lowermost blank to rest on the surface of said feed plate at the path of said series of orifices and the successive lowermost blanks to enter said orifices, means for intermittently rotating said feed plate, means for arresting said feed plate with three of said orifices respectively at the blank feeding station, a cutting station and a ring liner depositing station, cutting means arranged at said cutting station for producing a ring liner from the disc blank, means at said depositing station for forcing the cut ring liner out of its orifice in the feed plate and on to a stack holder, and a stack holder at said depositing station for receiving said cut ring liner.

9. In a machine for cutting and handling ring liners, the combination of a thin and intermittently rotatable feed plate having a circular series of orifices adapted to receive disc blanks of liner material from a stack of the same, a stack holder for said blanks arranged at a feeding station to allow the lowermost blank to rest on the surface of said feed plate at the path of said series of orifices, means for rotating the feed plate intermittently in one direction, means for centering said feed plate with three of said orifices respectively at the blank feeding station, a cutting station and a ring liner depositing station, cutting means arranged at said cutting station for producing a ring liner from the disc blank, means at said depositing station for forcing the cut ring liner out of its orifice in the feed plate and onto a stack holder, and a stack holder at said depositing station for receiving said cut ring liner.

10. In a machine for cutting and handling ring liners, the combination of a thin and intermittently rotatable feed plate having a circular series of orifices adapted to receive disc blanks of liner material from a stack of the same, a stack holder for said blanks arranged at a feeding station to allow the lowermost blank to rest on the surface of said feed plate at the path of said series of orifices, means for rotating the feed plate intermittently in one direction, means for centering said feed plate with three of said orifices respectively at the blank feeding station, a cutting station and a ring liner depositing station, cutting means arranged at said cutting station for producing a ring liner from the disc blank, means at said depositing station for forcing the cut ring liner out of its orifice in the feed plate and onto a stack holder, a removable stack holder at said depositing station for receiving said cut ring liner, and means for moving said stack holder vertically.

11. In a machine for cutting and handling ring liners, the combination of a thin and intermittently rotatable feed plate having a circular series of orifices adapted to receive disc blanks of liner material from a stack of the same, a stack holder for said blanks arranged at a feeding station to allow the lowermost blank to rest on the surface of said feed plate at the path of said series of orifices, means for rotating the feed plate intermittently in one direction, means for arresting said feed plate with three of said orifices respectively at the blank feeding station, a cutting station and a ring liner depositing station, cutting means arranged at said cutting station for producing a ring liner from the disc blank, means at said depositing station for forcing the cut ring liner out of its orifice in the feed plate and onto a stack holder, and an inclinable and vertically movable stack holder at said depositing station for receiving said cut ring liner.

12. In a machine for cutting and depositing ring liners in successive arrangement, to be thereafter applied in such arrangement for feeding one by one to be assembled with can ends, the combination of ring liner cutting and depositing means, an invertible stack holder for the cut ring liners and having a bottom supporting element, and a movable weight arranged above the bottom element of the stack holder above which weight the ring liners are successively deposited by said means as they are cut.

In testimony whereof I affix my signature.

CHARLES W. GRAHAM.